United States Patent [19]

Stone

[11] Patent Number: 4,922,653
[45] Date of Patent: May 8, 1990

[54] PLANT WATERING AND FEEDING SUPPORT SYSTEM

[76] Inventor: Alan Stone, 74 Vincennes, Pointe Claire, Quebec, Canada, H9R 4M2

[21] Appl. No.: 291,152

[22] Filed: Dec. 28, 1988

[51] Int. Cl.$^5$ .................... B05B 13/02; A01G 17/06
[52] U.S. Cl. .......................................... 47/45; 47/48.5
[58] Field of Search ...................... 47/45, 47, 48.5, 27

[56] References Cited

U.S. PATENT DOCUMENTS

| | | | |
|---|---|---|---|
| 963,030 | 7/1910 | Balch | 47/45 |
| 2,809,468 | 10/1957 | Eliot | 47/44 |
| 2,990,647 | 7/1961 | Himebaugh | 47/48.5 |
| 3,345,774 | 10/1967 | Delbuguet | 47/48.5 |
| 3,471,968 | 8/1969 | Letz | 47/47 |
| 3,579,908 | 5/1971 | Morgan | 47/45 |
| 3,638,814 | 2/1972 | Lowery | 47/45 |
| 3,672,571 | 9/1972 | Goodricke | 47/47 |
| 4,223,840 | 9/1980 | La Scala | 47/48.5 |
| 4,703,584 | 11/1987 | Chazalnoel | 47/47 |
| 4,745,706 | 5/1988 | Muza | 47/47 |

FOREIGN PATENT DOCUMENTS 434853  10/1967  Switzerland ........................ 47/48.5

*Primary Examiner*—Henry E. Raduazo
*Attorney, Agent, or Firm*—Samuel Meerkreebs

[57] ABSTRACT

A plant watering and feeding support system comprises at least three upstanding tubular stakes. Each stake has a lower end thereof planted in a soil. The stakes each have a part located above a ground surface of the soil which is adapted with a connector for receiving ends of tubular cross members which extend therefrom in a horizontal plane and generally join the parts of the stakes located above the ground. Therefore, a horizontal liquid distribution network is defined. A liquid poured in at least a top end of one of the stakes thus distributes to the other stakes through the distribution network and to the soil downwardly by way of the stakes through the lower ends thereof. The plant is basically supported by the cross members. The connectors are adapted to receive at their upper ends the lower ends of vertical tubes which are provided at their upper ends with further connectors. Further tubular cross members join these further connectors to provide the watering and feeding support system with a further horizontal distribution network. The number of levels of the support system is dependent upon the height of the plant and its ability to support itself.

8 Claims, 2 Drawing Sheets

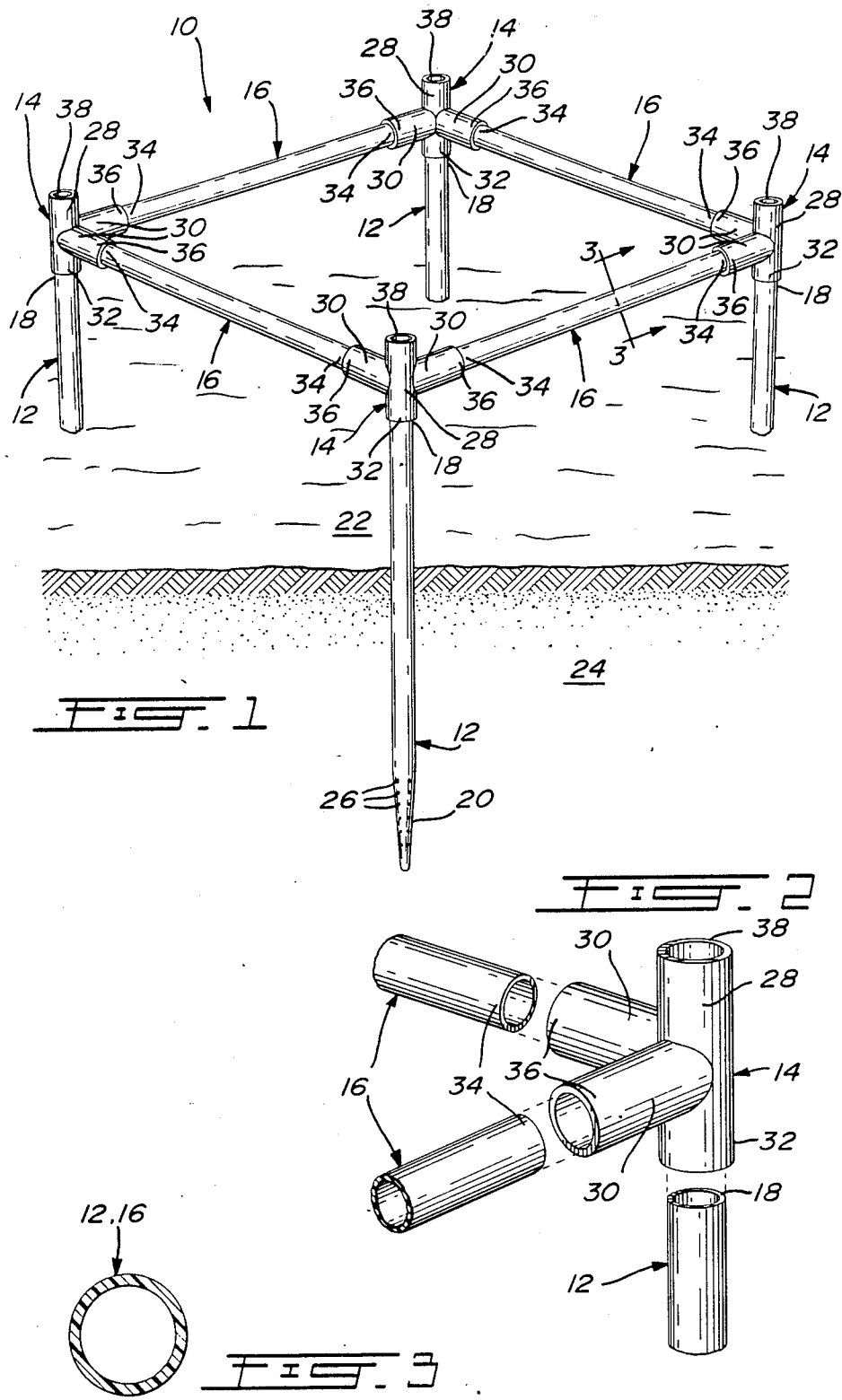

PLANT WATERING AND FEEDING SUPPORT SYSTEM

BACKGROUND OF THE INVENTION

1. Field of the Invention

The present invention relates to a plant supporting structure and, more particularly, pertains to a plant watering and feeding system.

2. Description of the Prior Art

Plant watering and feeding devices are well known in the prior art. A first category includes large scale irrigation systems for crops, trees and the like. The trickle irrigation method or drip irrigation is well known and used for such applications. Such systems are disclosed in U.S. Pat. No. 3,672,571, which issued to J. C. Goodricke on June 27, 1972, and in U.S. Pat. No. 4,223,840, which issued to W. La Scala et al on Sept. 23, 1980.

A second category relates to watering and feeding devices basically adapted for single plants or small groupings thereof. Unlike the above trickle irrigation systems, these devices are not provided with complex and continuous water supply conduits. The devices of this second category to which the present invention belongs are basically aimed at individuals who have small gardens, potted plants or the like and at greenhouse growers. Most known devices in this category comprise the following basic elements: a hollow stake which is planted in the ground and which can withhold and distribute water and fertilizers; and various means for temporarily fixing the plants to the stakes, straps being used therefor in U.S. Pat. Nos. 2,809,468, which issued to S. Eliot on Oct. 15, 1957, and 3,471,968, which issued to L. R. Letz on Oct. 14, 1969. The latter discloses a telescopic stake which is held in a desired position by Tee-shaped screws around which the plant can be twisted and therefore be supported thereby. U.S. Pat. No. 3,345,774, which issued to R. G. Delbuguet on Oct. 10, 1967, also discloses a gravity flow feeding device which further comprises a screw for adjusting the flow of the fed fluid. In Delbuguet, the vertical hollow tube is adapted with holes for receiving horizontal rods and ribbons which are used for securing the plant thereto. In U.S. Pat. No. 4,745,706, which issued to R. Muza et al on May 24, 1988, the plant watering and feeding stake is provided with longitudinal grooves in which snap-on plastic straps are mounted for supporting the plant, whereby the straps can move upwardly along the stake with the plant as it grows thus eliminating the need of repositioning the plastic strap supports as the plant grows.

Basically, all of the above plant watering and feeding support devices are intended for supporting and feeding the plant from one of the sides thereof. In the case of heavy or spread out plants, the support provided by such devices is impractical and sometimes useless. Moreover, water and fertilizer are fed to the roots of the plants on only one side area thereof.

Furthermore, the above devices are not designed for easily accommodating different plant sizes, meaning not only different heights but also different breadths.

SUMMARY OF THE INVENTION

It is therefore an aim of the present invention to provide a plant watering and feeding device which is adapted for ensuring substantial peripheral support of the plant.

It is also an aim of the present invention to provide such a device in which water and fertilizer are peripherally fed to the roots of the plant.

It is a further aim of the present invention to provide a plant watering and feeding device designed for easily and quickly filling the same with water and fertilizer and having a distribution network therefor.

It is a further aim of the present invention to provide a plant watering and feeding device having modulation means for being easily adaptable for accommodating generally all plant sizes, vertical as well as transverse.

It is a further aim of the present invention to provide a plant watering and feeding device that is economical even with all its advantages and possibilities.

It is a further aim of the present invention to provide a plant watering and feeding device which can be used in the off season.

It is a further aim of the present invention to provide a plant watering and feeding device in which the plant is not tied but merely supported.

A construction in accordance with the present invention comprises a plant watering and feeding system having at least three substantially upstanding tubular stake means each having a lower end thereof adapted to be planted in a soil means. The stake means each have a part thereof adapted to be located above a ground surface of the soil means. A connection means is provided for receiving ends of tubular side tube means which extend therefrom in a substantially horizontal plane for joining the stake means. A substantially horizontal distribution network is therefore defined. A liquid poured in a top end of at least one of the stake means is thus distributed to the other stake means through the distribution network and to the soil means by way of the stake means through the lower ends thereof. The side tube means is adapted to basically support at least one plant.

In a further construction in accordance with the present invention, each connection means for receiving the ends of the side tube means comprises a primary tube means mounted at a lower end thereof to an upper end part of the stake means. The connection means each further comprise secondary tube means mounted at the first end thereof to the primary tube means for extending substantially laterally therefrom. The ends of the cross-member means are adapted to be connected to the second ends of the secondary tube means.

In a further construction in accordance with the present invention, the tubular stake and cross-member means and the primary and secondary tube means have annular circular cross-sections. The secondary tube means thus extend diametrically from the primary tube means.

In a further construction in accordance with the present invention, the lower ends of the stake means are tapered for facilitating the introduction thereof in the soil means. The lower ends of the stake means are further provided with a plurality of openings therethrough for distributing the liquid in the soil means.

In a still further construction in accordance with the present invention, at least one of the upper ends of the primary tube means is fitted with funnel means for facilitating the filling of the system with the liquid.

In a still further construction in accordance with the present invention, vertical tube means are mounted at lower ends thereof to the upper ends of the primary tube means. A further horizontal distribution network is provided at a second level by further connection means mounted at upper ends of the vertical tube means and by further cross-member means joining the further connection means.

Another construction in accordance with the present invention comprises a plant watering and feeding system having a plurality of substantially vertical and horizontal members joined for forming a cage means. The cage means is adapted to support a plant planted in a soil means within the cage means. At least part of the members are tubular in order to form a liquid distribution network which includes means for receiving a liquid and further means for supplying the liquid to the soil means.

BRIEF DESCRIPTION OF THE DRAWINGS

Having thus generally described the nature of the invention, reference will now be made to the accompanying drawings, showing by way of illustration a preferred embodiment thereof and in which:

FIG. 1 is a perspective view partly in cross-section of a plant watering and feeding support system according to the present invention;

FIG. 2 is an exploded view of a corner connection and distribution member according to the present invention;

FIG. 3 is a cross-sectional view taken along lines 3—3 of FIG. 1 of a cross-member.

DESCRIPTION OF THE PREFERRED EMBODIMENTS

Figure 4:
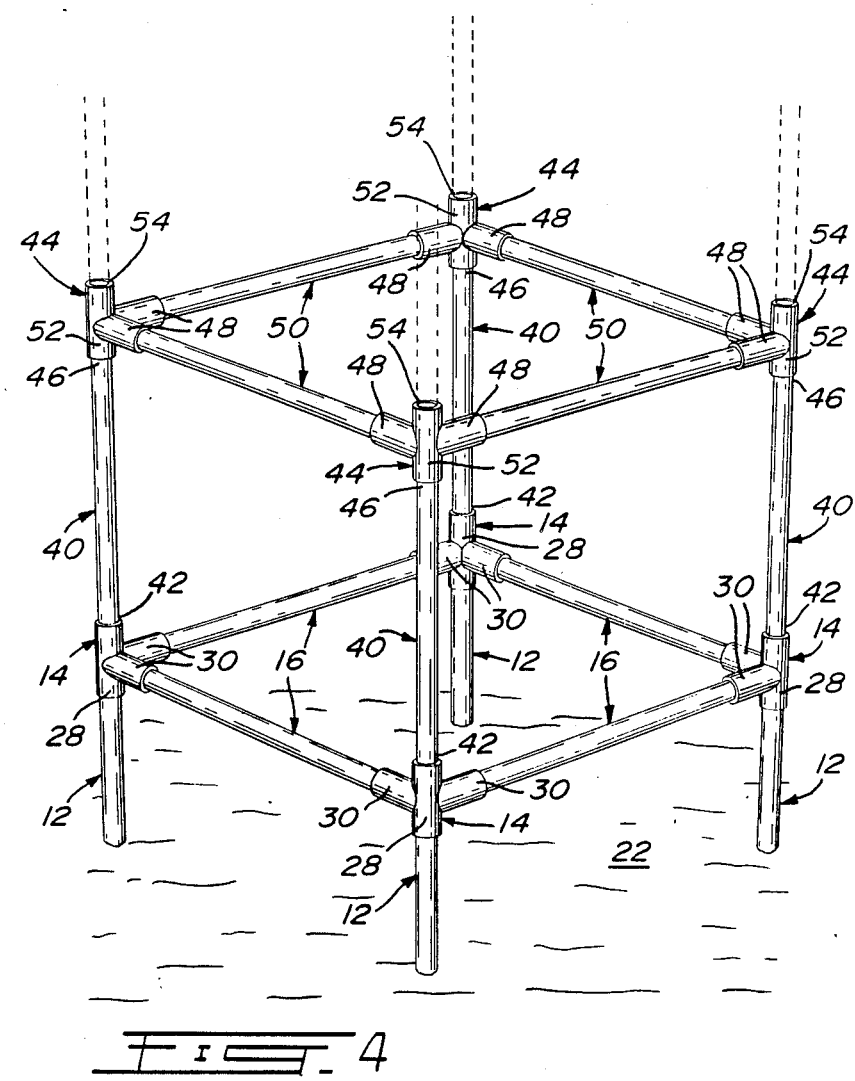
FIG. 4 is a perspective view of the plant watering and feeding support system according to the present invention to which an additional distribution and support level has been added, the dotted lines suggesting further levels.

Now referring to the drawings, and in particular to FIG. 1, a plant watering and feeding support system embodying the elements of the present invention and generally designated by the numeral 10 will be described.

More specifically, the plant watering and feeding support system 10 comprises four identical stakes 12, four identical corner connection and distribution members 14 and four identical cross-members 16. The stakes 12, the corner members 14 and the cross-members 16 are all tubular and made of a plastic material such as polyvinyl chloride which is better known as PVC.

Each stake 12 is open ended at an upper end 18 thereof as best seen in FIG. 2. A lower end part 20 of the stake 12 is tapered as best seen in FIG. 1 for facilitating the piercing and the planting of the stake 12 through a ground surface 22 in a soil 24. A plurality of openings 26 are defined in the lower end part 20 of the stake 12.

Each corner member 14 comprises a primary tubular member 28 from which a pair of secondary tubular members 30 extend substantially laterally therefrom, the secondary tubular members 30 being at right angles to each other and to the primary tubular member. This is best seen in FIG. 2.

The primary and secondary tubular members 28 and 30 of the corner members 14 have all basically the same inside diameter which also generally corresponds to the outside diameter of all the stakes 12 and cross members 16, the circular cross-section of which is illustrated in FIG. 3. The tubular members 28 and 30 have similar cross-sections. This, along with the plastic construction of the tubular parts, allows for an easy and quick pressure fit mounting of these parts. Therefore, the upper ends 18 of the stakes 12 are pressure-fitted within lower ends 32 of the primary tubular members 28 of the corner members 14. In the same manner, each end 34 of the cross members 16 are pressure-fitted within an associated free end 36 of the secondary tubular members 30 of the corner members 14. This is best seen in FIG. 2 as well as in FIG. 1.

By mounting the cross members 16 in the secondary tubular members 30 and the stakes 12 in the primary tubular members 28 as seen in FIG. 1, a rectangular and, more particularly in this embodiment, a square configuration is basically obtained in a substantially horizontal plane. This therefore creates a distribution network for a water and fertilizer mixture or the like introduced therein by way of at least one upper end 38 of the primary tubular members 28 of the corner members 14. The mixture is thus introduced in at least one of the top ends 38 of the corner members 14 and is distributed horizontally from the filled stake through the secondary tubular members 30 and the cross members 16 towards the remaining stakes and downwardly through all of the stakes 12 towards the lower end parts 20 thereof. This gravity flow in the soil 24 is gradually ensured by the openings 26. It is easily seen that the water and fertilizer mixture needs only to be introduced in one of the corner members 14.

It is also easily seen that a plant located within this watering and feeding support system 10 can be peripherally supported by the cross members 16. Furthermore, the water and fertilizer mixture is peripherally distributed in the soil 24 with respect to the roots of the plant. This thus ensures a substantially equal distribution of the mixture in the soil 24.

Now referring to FIG. 4, vertical tubes 40 similar to the cross members 16 are pressure-fitted at lower ends 42 thereof in the upper ends 38 of the corner members 14 associated therewith. Further corner members 44 are mounted at upper ends 46 of the vertical tubes 40. Secondary tubular members 48 of the corner members 44 are joined by further cross members 50. The corner members 44 include primary tubular members 52 each having a top end 54 in which the water and fertilizer mixture can be introduced.

It is easily seen from FIGS. 1 and 4 that, by varying the lengths of the stakes 12, the cross members 16 and 50 and the vertical tubes 40, any "cage" dimension can be achieved for accommodating any plant size and stiffness or rigidity. Levels or units are added by duplicating what has been described with respect to FIG. 4.

The above-described modular construction of the plant watering and feeding support system 10 represents a principle advantage thereof. Other advantages follow hereinbelow.

With the inventive system, the plants do not need to be tied as they are simply supported by the different levels of cross members 16 and 50. Upon any plant's growth, additional stacked levels or units are easily mounted onto the original system 10 of FIG. 1 to obtain further systems as the one suggested in FIG. 4.

All the cross members and vertical tubes 16, 40 and 60, which basically and respectively dictate the horizontal area and the height of the system 10, can be economically purchased in standard lengths in any hardware store or plumbing supply house and then cut to proper desired longitudinal dimensions. This is therefore a very economical system as with the basic stakes 12 and the corner members 14 any configuration can be achieved by way of the cross members and vertical tubes 16, 40 and 50.

It is easy to adjust the size of the system 10 if the plants grow laterally as well as vertically, or both.

Smaller sizes of the plant watering and feeding support system 10 could be made to be placed in plant pots for house plants.

The stakes 12, the corner members 14, the cross members 16 and the vertical tubes 40 provide the system 10 with a storage capacity for the water and fertilizer mixture. The soil 24 is fed with this mixture gradually by way of openings 26. This is thus a self watering and feeding system using gravity flow.

Due to the fact that there is no need to tie and hold the plants upright, this system requires less labor for greenhouse growers of plants such as those who raise hot house tomatoes.

A further interesting advantage of the present invention resides in the fact that, during the off season, the system can be easily used to protect rose bushes or the like. Cardboard pieces (not shown) could be vertically positioned between each adjacent pair of corner members 14 and along the cross members 16 associated therewith for producing an upstanding housing around the rose bush which can then be stuffed with leaves, grass, etc., and thus protect the rose bushes during the winter.

Further embodiments in accordance with the present invention which are not shown are described hereinbelow.

The corner members could be provided with two secondary tubular members defining therebetween an angle of 60° in order to horizontally form a triangular configuration as opposed to the illustrated square-shaped configuration. Moreover, flexible cross members would provide the possibility of forming circular-shaped configurations. Elongated rectangular configurations could be produced by adding between the corner members intermediate reinforcing parts. These reinforcing parts could simply be a variation of the corner members 14 as illustrated in FIG. 2 wherein the secondary tubular members are aligned as they extend therefrom. A whole row of tomatoes or the like could therefore be fed and supported.

Snap-on caps (not shown) could also be provided near the upper ends 38 of the corner members 14 for preventing rain water from filling the tube of the system without fertilizer. These snap-on caps would also prevent any foreign substance from entering the tubes of the system and subsequently blocking the openings 26.

A funnel (not shown) could also be provided at the upper ends 38 of the corner members 14 of the highest distributing level of the system 10 for facilitating the introduction of the water and fertilizer mixture therein.

The above-described pressure fit connections carry the advantage that parts so mounted are easily dismantled for storage or for system size readjustments. On the other hand, other types of connections (not shown) could be used such as glued connections, screwed connections, pressure fit tapered connections, ribbed connections, etc. For example, a PVC-type glue which partly melts the plastic could be used for producing a watertight although permanent seal.

It is easily seen that the present invention as described above has many advantages which can be summarized by the following: economical, modular, multi purpose, adjustable, etc.

I claim:

1. A plant watering and feeding system, comprising at least three substantially upstanding tubular stake means each having a lower end thereof adapted to be planted in a soil means and having a part thereof adapted to be located above a ground surface of said soil means; a connection means mounted on each said stake means receiving ends of tubular cross member means which extend therefrom in a substantially horizontal plane for joining said stake means to define a substantially horizontal distribution network, said connection means receiving lower ends of vertical tube means, said vertically stacked tube means extending upwards from said connection means and being provided at upper ends thereof with further connection means, further cross member means being provided for joining said further connection means, whereby a further horizontal distribution network is provided to said system at a second level thereof, whereby a liquid poured in a top end of at least one of the vertical tube means is distributed to the other vertical tube means and to said stake means through said distribution networks and to the soil means by way of said stake means through said lower ends thereof, said cross member means being also adapted for basically supporting at least one plant.

2. A plant watering and feeding system as defined in claim 1, wherein each said connection means comprises a primary tube means mounted at a lower end thereof to an upper end part of said stake means, and secondary tube means mounted at first ends thereof to said primary tube means for extending substantially laterally therefrom, said ends of said cross member means being adapted to be connected to second ends of said secondary tube means, said lower ends of said vertical tube means being mounted to upper ends of said primary tube means, said further connection means being similar to said connection means and comprising primary tube means and secondary tube means extending laterally therefrom, said further connection means being mounted at lower ends of said primary tube means thereof to said upper ends of said vertical tube means with said further cross member means being joined at ends thereof to said secondary tube means of said further connection means.

3. A plant watering and feeding system as defined in claim 2, wherein said tubular stake and cross-member means, said vertical tube means and further cross member means, and said primary and secondary tube means of said connection means and of said further connection means all have annular circular cross-sections, and wherein said secondary tube means extend diametrically from said primary tube means.

4. A plant watering and feeding system as defined in claim 3, wherein said lower ends of said stake means are tapered for facilitating the introduction thereof in said soil means and are further provided with a plurality of openings therethrough for distributing said liquid in said soil means.

5. A plant watering and feeding system as defined in claim 2, wherein a plurality of such further horizontal distribution networks are provided for producing further support levels for accommodating higher plants.

6. A plant watering and feeding system as defined in claim 2, wherein said ends of said cross member means are connected to said second ends of said secondary tube means by means selected from the group of a screwed, a tapered, a pressure-fitted, a glued and a ribbed connection.

7. A plant watering and feeding system as defined in claim 1, wherein said four stake means of substantially equal size are provided, said vertical tube means within each one of the further horizontal distribution network being of equal size, said cross member means and said further cross member means being all of equal size thereby forming square-shaped horizontal distribution networks.

8. A plant watering and feeding system, comprising a cage means formed by a plurality of substantially vertical and horizontal members joined by hollow connection means for supporting a plant planted in a soil means within said cage means, at least part of said members being tubular for forming a liquid distribution network including means for receiving a liquid and further means for supplying said liquid to the soil means, said connection means being adapted for receiving at least one further cage means in a substantially vertical stacked relationship thereby adding a further distribution network to said system which communicates with said distribution network.

* * * * *